Oct. 15, 1957     G. S. HARTLEY     2,809,469
METHOD AND MEANS FOR INTRODUCING A PREDETERMINED
AMOUNT OF POISONOUS MATERIAL BENEATH
THE SURFACE OF THE SOIL
Filed June 9, 1953
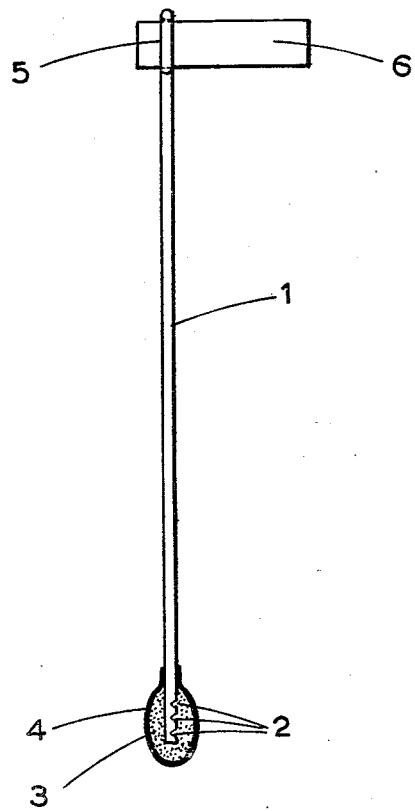
Inventor
*Gilbert Spencer Hartley.*
by *Thiess, Olgar, Mecklenburger, van Holst & Coltman*
Attorneys.

United States Patent Office 2,809,469
Patented Oct. 15, 1957

2,809,469

METHOD AND MEANS FOR INTRODUCING A PREDETERMINED AMOUNT OF POISONOUS MATERIAL BENEATH THE SURFACE OF THE SOIL

Gilbert Spencer Hartley, Fulbourn, England, assignor to Pest Control Limited, Bourn, England, a British company Application June 9, 1953, Serial No. 360,613

Claims priority, application Great Britain June 16, 1952

15 Claims. (Cl. 47—48.5)

This invention relates to methods and means for introducing a predetermined amount of a poisonous material beneath the surface of the soil.

In the fight against plant pests, good use has been made for some time of so-called systemic insecticides, i. e. insect poisons which can enter the sap stream of living plants through the leaves and roots, thus makin the plants poisonous to insects for several weeks. In treating plantations of larger plants like cocoa trees or coffee bushes, and also in treating smaller plants in greenhouses and nurseries, and potted ornamental flowers, it is desirable to apply a measured amount of the insecticides to the roots of each individual plant.

The following are examples of such systemic insecticides:

(1) Compounds of the general formula:

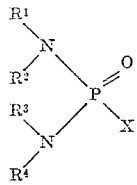

where $R^1$, $R^2$, $R^3$ and $R^4$ each represent an alkyl or cycloalkyl group containing not more than eight carbon atoms, whilst alternatively $R^1$ and $R^3$ may each represent a hydrogen atom, and where X is fluorine or the azido group $N_3$.

(2) Compounds of the general formula:

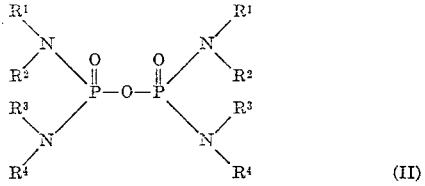

where $R^1$, $R^2$, $R^3$ and $R^4$ have the above meaning.

Other important systemic insecticides are compounds of the general formula:

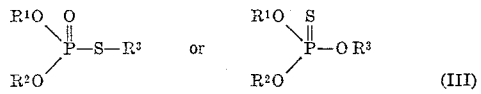

wherein $R^1$ and $R^2$ each represent an alkyl group containing not more than eight carbon atoms and $R^3$ represents an alkyl chain which may be interrupted by one or more sulphur or oxygen atoms. An example of such a compound is diethylethylmercaptoethyl thiophosphate, formulated $(EtO)_2P(S)OC_2H_4SEt$ or $(EtO)_2P(O)SC_2H_4SEt$.

As the insecticides used are strongly poisonous to man they should be offered to the consumer in a form in which they can be stored and applied to the soil by unskilled workers without undue risk.

The present invention provides a device whereby poisonous material can safely be divided into units of predetermined size which can be packed, transported, stored and introduced into the soil. The said device comprises a shaft strong enough to be thrust into the soil, provided with a head of a solid material surrounding one end of the shaft, the said head consisting at least in part of a predetermined quantity of a systemic insecticide, and being coated with a plastic material which will dissolve within a reasonable time in the moisture of the soil. The shaft may, for example, be made of metal or plastic. In use, the device is thrust head first into the ground.

Thus the invention also provides a method of introducing a predetermined quantity of systemic insecticide beneath the surface of the soil, comprising thrusting head first into the soil a shaft strong enough to be thrust into the soil, provided with a head of a solid material surrounding one end of the shaft, the said head consisting at least in part of a predetermined quantity of a systemic insecticide, and being coated with a plastic material which will dissolve within a reasonable time in the moisture of the soil.

Optionally the butt end of the shaft is provided with a loop or hook for the double purpose of making the device easier to grip and handle, and for enabling a label to be attached to the butt to mark the spot where the insecticide has been introduced into the ground.

The head end is preferably provided with indentations or notches to provide a grip for the solid head. The head end of the shaft may also be formed as a single or double hook or otherwise shaped to provide an anchorage for the head.

One embodiment of the device of the invention is illustrated in the single figure of the accompanying drawing. In this embodiment a stout wire 1 is provided at one end with notches 2. This notched end is surrounded by a head 3 of a predetermined quantity of solid systemic insecticide, the head 3 bearing a coating 4 of a plastic material adapted to dissolve in the moisture of the soil. The other end of the wire is bent to form a hook 5 embracing a label 6.

The head may be produced from a solid systemic insecticide of a suitable melting point (e. g. bis-isopropyl-amino-fluorophosphine oxide, M. P. 65° C.), by dipping the shaft into the molten substance, pulling it out again and allowing the substance to solidify; the amount of active substance forming the head may be controlled by variation of the depth of the dip and of the rheological properties of the melt, the latter being controlled by temperature and by the incorporation of inert filler. Asbestos wool or a similar inert, solid fibrous filler may also be admixed with the melt to give the finished head more coherence.

When the head has solidified, it is given a thin coating of a plastic material which produces a smooth finished surface when dry, and dissolves within a reasonable time in the moisture of the soil, without being too hygroscopic for storage in a moist atmosphere. Suitable materials are gums and gelatine; and cellulose acetate phthalates or cellulose acetate butyrate phthalate for such insecticides as do not exert a solvent effect on these materials. The head may be dipped into a solution of such substances and then allowed to dry. The coating may also be applied by spraying or any other suitable manner. A mineral, or preferably a fibrous, filler may be added to the solution of the plastic, to reduce the tendency of the dry coating to crack. Asbestos or cotton linters can be used.

If the active substance is a liquid, it may be incorporated into a solid inert carrier. One may, e. g., precast a porous cement-like body into the pores of which the liquid poison is soaked. The resulting head may receive a protective coating of a water-soluble material as in the case of heads made of a solid systemic insecticide.

A convenient method of incorporating into a solid base certain liquid systemic insecticides which are soluble in water but stable under neutral conditions (i. e. bis-dimethylamino-fluorophosphine oxide, bis-dimethylamino azido phosphine oxide and bis-dimethylamino phosphonous anhydride) is to mix calcium sulphate hemihydrate (i. e. builder's plaster of Paris) with an aqueous solution of the insecticide and allow the mixture to set.

A water-soluble systemic insecticide which is moderately but not indefinitely stable in water (such as dimethylamino mono-isopropylamino-fluorophosphine oxide and dimethylamino mono-isopropylamino azido phosphine oxide) can be dealt with in the same way if the solidified head is subsequently dried.

Systemic insecticides which have only slight solubility in water, such as compounds of the general formula III above, can be dealt with in an analogous way in the form of an aqueous emulsion.

With 100 gms. of dry plaster of Paris I prefer to use up to 25 gms. of liquid insecticide. If much more than 25 gms. is used the final product is not hard enough to be useful and tends to liberate excess insecticide by sweating.

Water in excess of that required for the reaction $\frac{1}{2}H_2O \rightarrow 2H_2O$ is necessary in order that a workable paste is formed initially.

Preferred mixture:

| | Parts by weight |
|---|---|
| Plaster of Paris | 100 |
| Liquid insecticide | 20 |
| Water | 50 |

Mixing is effected rapidly as the mixture hardens quickly. It is allowed to harden as a tip or head (formed by dipping) on a wooden shaft or in a mould which includes the notched end of a piece of wire.

Another way of forming a solid tip or head is as follows:

To a solution of gum in water is added the water-soluble systemic insecticide, and a mineral filler (kieselguhr or china clay) is then added to form a fairly stiff paste. On dipping a wire into this paste a thin layer adheres to the wire and on drying by holding in a dry atmosphere for a period of approximately ½ hour this layer becomes sufficiently hard to enable a second dipping operation to be carried out, which now causes a thicker layer to be withdrawn, which can again be hardened by drying and thickened by subsequent dipping, and so on. The resulting head is not so hard as that formed with plaster of Paris, but is found to be hard enough for the purpose required if subsequently coated with plastic coating as previously mentioned.

A suitable dipping composition is as follows:

| | Parts by weight |
|---|---|
| Bis-dimethylamino-fluorophosphine oxide | 30 |
| Water | 32 |
| Gum arabic | 3 |
| China clay | 25 |

The manufacture of the device of the invention is easy, safe and cheap. No complicated machinery is required. The headed shafts can easily be packed in boxes, transported and stored. The individual headed shafts, having an appreciable weight and length, are not likely to fall to the ground and get lost unnoticed.

In order to make the device still safer one may add to the composition forming the outer coating some colouring matter and some substance with a repugnant smell (e. g. ethyl-isothiocyanate) and taste (e. g. 2-mercapto-benz-thiozole).

What I claim is:

1. A device for use in introducing a predetermined quantity of a systemic insecticide beneath the surface of the soil, comprising a shaft strong enough to be thrust into the soil, provided with a head of a solid material surrounding one end of the shaft, the said head consisting at least in part of a predetermined quantity of a systemic organic insecticide, coated with a plastic material which will dissolve within a reasonable time in the moisture of the soil.

2. A device for use in introducing a predetermined quantity of a systemic insecticide beneath the surface of the soil, comprising a shaft strong enough to be thrust into the soil, provided with a head of a solid material surrounding one end of the shaft, the said head consisting at least in part of a predetermined quantity of a systemic organic insecticide, coated with a plastic material selected from the group consisting of gums, gelatine, cellulose acetate phthalates and cellulose acetate butyrate phthalate.

3. A device for use in introducing a predetermined quantity of a systemic insecticide beneath the surface of the soil, comprising a shaft strong enough to be thrust into the soil, provided with a head of a solid material surrounding one end of the shaft, the said head consisting of a solid systemic organic insecticide, coated with a plastic material which will dissolve within a reasonable time in the moisture of the soil.

4. A device for use in introducing a predetermined quantity of a systemic insecticide beneath the surface of the soil, comprising a shaft strong enough to be thrust into the soil, provided with a head of a solid material surrounding one end of the shaft, the said head consisting of bis-isopropylamino-fluorophosphine oxide, coated with a plastic material which will dissolve within a reasonable time in the moisture of the soil.

5. A device for use in introducing a predetermined quantity of a systemic insecticide beneath the surface of the soil, comprising a shaft strong enough to be thrust into the soil, provided with a head of a solid material surrounding one end of the shaft, the said head consisting of a solid inert carrier in which is incorporated a liquid organic systemic insecticide, coated with a plastic material which will dissolve within a reasonable time in the moisture of the soil.

6. A device for use in introducing a predetermined quantity of a systemic insecticide beneath the surface of the soil, comprising a shaft strong enough to be thrust into the soil, provided with a head of a solid material surrounding one end of the shaft, the said head consisting of set, hydrated plaster, hydrated with water containing a liquid water-soluble organic systemic insecticide which is sufficiently stable in water, the said head being coated with a plastic material which will dissolve within a reasonable time in the moisture of the soil.

7. A device for use in introducing a predetermined quantity of a systemic insecticide beneath the surface of the soil, comprising a shaft strong enough to be thrust into the soil, provided with a head of a solid material surrounding one end of the shaft, the said head consisting of set, hydrated plaster, hydrated with water containing a liquid water-soluble organic systemic insecticide selected from the group consisting of bis-dimethylamino-fluorophosphine oxide, bis-dimethylamino azido phosphine oxide and bis-dimethylamino phosphonous anhydride, the said head being coated with a plastic material which will dissolve within a reasonable time in the moisture of the soil.

8. A device for use in introducing a predetermined quantity of a systemic insecticide beneath the surface of the soil, comprising a shaft strong enough to be thrust into the soil, provided with a head of a solid material surrounding one end of the shaft, the said head consisting of set, hydrated plaster, hydrated with an aqueous emulsion of diethyl-ethylmercaptoethyl thiophosphate, the said head being coated with a plastic material which will dissolve within a reasonable time in the moisture of the soil.

9. A device for use in introducing a predetermined quantity of a systemic insecticide beneath the surface of the soil, comprising a shaft strong enough to be thrust into the soil, provided with a head of a solid material surrounding one end of the shaft, the said head consisting of set, hydrated plaster, hydrated with water containing a liquid water-soluble organic systemic insecticide selected from the group consisting of dimethylamino-monoisopropylamino-fluorophosphine oxide and dimethylamino-monoisopropylamino azido phosphine oxide, and dried, the said head being coated with a plastic material which will dissolve within a reasonable time in the moisture of the soil.

10. A device for use in introducing a predetermined quantity of a systemic insecticide beneath the surface of the soil, comprising a shaft strong enough to be thrust into the soil, provided with a head of a solid material surrounding one end of the shaft, the said head consisting of a dried aqueous paste of a mineral filler, water, gum and a liquid water-soluble organic systemic insecticide which is sufficiently stable in water, the said head being coated with a plastic material which will dissolve within a reasonable time in the moisture of the soil.

11. A device for use in introducing a predetermined quantity of a systemic insecticide beneath the surface of the soil, comprising a shaft strong enough to be thrust into the soil, provided with a head of a solid material surrounding one end of the shaft, the said head consisting of a dried aqueous paste of a mineral filler, water, gum and a liquid water-soluble systemic insecticide selected from the group consisting of bis-dimethylamino-fluorophosphine oxide, bis-dimethylamino azido phosphine oxide and bis-dimethylamino-phosphonous anhydride, the said head being coated with a plastic material which will dissolve within a reasonable time in the moisture of the soil.

12. A device for use in introducing a predetermined quantity of a systemic insecticide beneath the surface of the soil, comprising a shaft strong enough to be thrust into the soil, provided with a head of a solid material surrounding one end of the shaft, the said head consisting of a dried aqueous paste of a mineral filler, water, gum and a liquid water-soluble systemic insecticide selected from the group consisting of dimethylamino-monoisopropylamino-fluorophosphine oxide and dimethylamino-monoisopropylamino azido phosphine oxide, the said head being coated with a plastic material which will dissolve within a reasonable time in the moisture of the soil.

13. A method of introducing a predetermined quantity of systemic insecticide beneath the surface of the soil, comprising thrusting head first into the soil a shaft strong enough to be thrust into the soil, provided with a head of a solid material surrounding one end of the shaft, the said head consisting at least in part of a predetermined quantity of a systemic insecticide, and being coated with a plastic material which will dissolve within a reasonable time in the moisture of the soil.

14. A device for use in introducing a predetermined quantity of a systemic insecticide beneath the surface of the soil, comprising a shaft strong enough to be thrust into the soil, provided with a head of a solid material surrounding one end of the shaft, the said head consisting of a dried aqueous paste of china clay, water, gum arabic and bis-dimethylamino-fluoro-phosphine oxide, the said head being coated with a plastic material which will dissolve within a reasonable time in the moisture of the soil.

15. A device for use in introducing a predetermined quantity of a systemic insecticide beneath the surface of the soil, comprising a shaft strong enough to be thrust into the soil, provided with a head of a solid material surrounding one end of the shaft, the said head consisting of a solid, water-bound mineral mass containing a liquid water-soluble organic systemic insecticide, the said head being coated with a plastic material which will dissolve within a reasonable time in the moisture of the soil.

References Cited in the file of this patent

UNITED STATES PATENTS

| | | |
|---|---|---|
| 667,467 | Sherman | Feb. 5, 1901 |
| 968,013 | White | Aug. 23, 1910 |
| 1,280,580 | Swett | Oct. 1, 1918 |
| 2,502,966 | Kosolapoff | Apr. 4, 1950 |

FOREIGN PATENTS

| | | |
|---|---|---|
| 500,118 | Belgium | Jan. 15, 1951 |
| 511,385 | Belgium | May 31, 1952 |
| 388,566 | Germany | Jan. 15, 1924 |
| 679,631 | Great Britain | Sept. 24, 1952 |
| 688,766 | Great Britain | Mar. 11, 1953 |